United States Patent [19]

Flotow et al.

[11] Patent Number: 5,181,593
[45] Date of Patent: Jan. 26, 1993

[54] CLUTCH WEAR INDICATOR APPARATUS
[75] Inventors: Richard A. Flotow, Butler; J. Michael Lewis, Corunna, both of Ind.
[73] Assignee: Dana Corporation, Toledo, Ohio
[21] Appl. No.: 837,264
[22] Filed: Feb. 18, 1992
[51] Int. Cl.$^5$ .................. F16D 66/02; F16D 23/14
[52] U.S. Cl. ............................. 192/30 W; 192/98
[58] Field of Search ............... 192/30 W, 98; 188/1.11
[56] References Cited
U.S. PATENT DOCUMENTS

| | | | |
|---|---|---|---|
| 2,323,489 | 7/1943 | Schmidt et al. | 192/110 |
| 3,406,800 | 10/1968 | Buchanan et al. | 192/30 W X |
| 3,469,666 | 9/1969 | Goode | 192/30 R |
| 3,982,614 | 9/1976 | Bisaillon | 192/30 W |
| 4,174,024 | 11/1979 | Hagiwara | 192/30 W X |
| 4,414,533 | 11/1983 | Scott et al. | 340/52 R |
| 4,474,274 | 10/1984 | Lutz et al. | 192/30 W |
| 4,491,204 | 1/1985 | Dirauf et al. | 192/30 W X |
| 4,705,151 | 11/1987 | Leigh-Monstevens et al. | 192/111 A |
| 4,934,501 | 6/1990 | Gay et al. | 192/70.27 |
| 5,058,718 | 10/1991 | Tojima et al. | 192/30 W |

FOREIGN PATENT DOCUMENTS

| | | | |
|---|---|---|---|
| 2640088 | 3/1978 | Fed. Rep. of Germany | 192/30 W |
| 61-6432 | 1/1986 | Japan | 192/30 W |
| 61-244927 | 10/1986 | Japan | 192/30 W |
| 579470 | 11/1977 | U.S.S.R. | 192/30 W |

Primary Examiner—Leslie A. Braun
Assistant Examiner—Andrea Pitts
Attorney, Agent, or Firm—MacMillan, Sobanski & Todd

[57] ABSTRACT

An apparatus for automatically sensing when the friction elements of a clutch are excessively worn and for generating a signal in response thereto is disclosed. The clutch includes a bearing housing which is adapted to be moved between engaged and disengaged positions. A shift assembly is provided for moving the bearing housing to the disengaged position. The shift assembly includes a pair of fingers which are normally spaced apart from the bearing housing when the clutch is engaged and the friction elements are not worn. However, when the friction elements become worn, the bearing housing engages the fingers of the shift assembly when the clutch is in the engaged position. A sensor is mounted in the bearing housing for generating a signal when the fingers are in contact therewith. The signal may be an electrical signal which is fed to a control circuit. The control circuit includes a timing and comparison circuit which activates an alarm device only when the signal from the sensor has been continuously generated for a predetermined period of time.

19 Claims, 3 Drawing Sheets

CLUTCH WEAR INDICATOR APPARATUS

BACKGROUND OF THE INVENTION

This invention relates in general to friction clutches for vehicles. In particular, this invention relates to an apparatus for automatically sensing when the friction elements of a clutch are excessively worn and, in response thereto, generating an indication to the driver of the vehicle of such wear.

Clutches are well known devices which are frequently employed in vehicles to selectively connect a source of rotational power, such as the crankshaft of an engine, to a driven mechanism, such as a transmission. Typically, a cover of the clutch is connected to a flywheel carried on the end of the engine crankshaft for rotation therewith. Between the flywheel and the clutch cover, a pressure plate is disposed. The pressure plate is connected for rotation with the flywheel and the cover, but is permitted to move axially relative thereto. A release bearing is connected to the pressure plate such that axial movement of the release bearing causes corresponding axial movement of the pressure plate.

A driven disc assembly is disposed between the pressure plate and the flywheel. The driven disc assembly is carried on an output shaft of the clutch, which forms the input to the transmission. Means are provided for selectively moving the release bearing (and, therefore, the pressure plate) back and forth in the axial direction. When the pressure plate is moved toward the flywheel, the driven disc assembly is frictionally engaged therebetween so as to cause the output shaft of the clutch to rotate with the flywheel, the cover, and the pressure plate. When the pressure plate is moved away from the flywheel, the driven disc assembly is released from such frictional engagement so as to disconnect this driving connection.

The driven disc assembly typically includes a hub which is splined onto the output shaft of the clutch for rotation therewith. A generally annular support plate is mounted on the hub for limited relative rotational movement. A plurality of friction elements are usually secured to the outer radial portions of the support plate. These friction elements are repeatedly engaged and disengaged by the pressure plate and the flywheel as the clutch is operated. When the clutch is new, the friction elements have a predetermined thickness. However, each time the clutch is engaged, the friction elements wear slightly thinner. After a certain amount of use, the thickness of the friction elements will have worn so thin that the clutch may not operated properly.

To compensate for such wear, many clutches are provided with a wear compensating structure which adjusts the internal components thereof as wear occurs. Some of such wear compensating structures operate manually, while others operate automatically. However, in both instances, the friction elements will eventually wear so thin that further compensating adjustment is not available. Because the friction elements are disposed internally within the clutch, it is difficult to inspect them, visually or otherwise, to determine if they have become excessively worn. Accordingly, it would be desirable to provide an apparatus for automatically sensing when the friction elements of a clutch are excessively worn and, in response thereto, generating an indication to the driver of the vehicle of such wear.

SUMMARY OF THE INVENTION

This invention relates to an apparatus for automatically sensing when the friction elements of a clutch are excessively worn and for generating a signal in response thereto. The clutch includes a bearing housing which is adapted to be moved between engaged and disengaged positions. A shift assembly is provided for moving the bearing housing to the disengaged position. The shift assembly includes a pair of fingers which are normally spaced apart from the bearing housing when the clutch is engaged and the friction elements are not worn. However, when the friction elements become worn, the bearing housing engages the fingers of the shift assembly when the clutch is in the engaged position. A sensor is mounted in the bearing housing for generating a signal when the fingers are in contact therewith. The signal may be an electrical signal which is fed to a control circuit. The control circuit includes a timing and comparison circuit which activates an alarm device only when the signal from the sensor has been continuously generated for a predetermined period of time.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
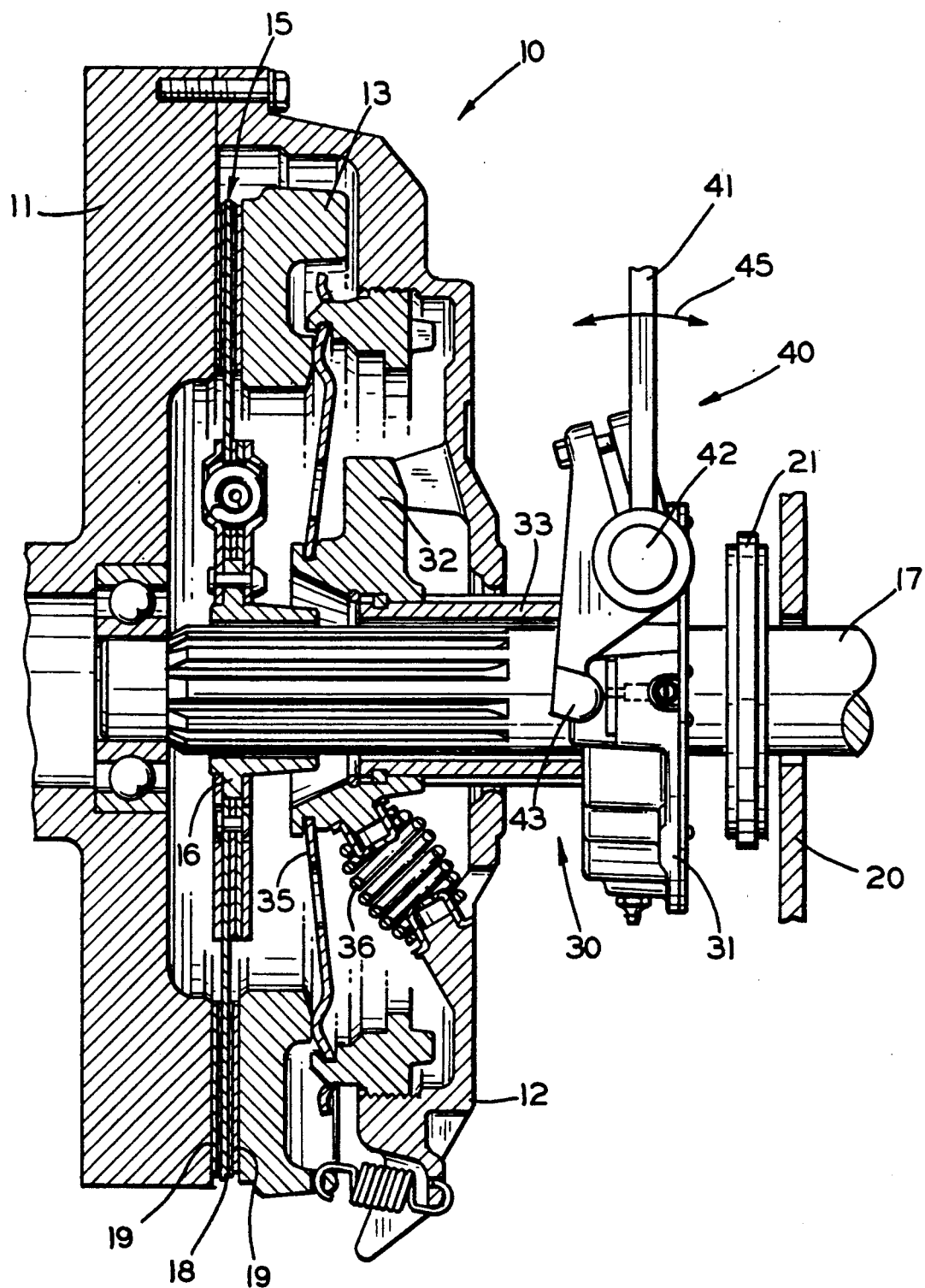
FIG. 1 is a sectional side elevational view of a clutch including a wear indicator apparatus in accordance with this invention.

Referring now to the drawings, there is illustrated in FIG. 1 a clutch, indicated generally at 10, which is adapted for use in a vehicle. The general structure and operation of the clutch 10 are well known in the art. The clutch 10 includes a flywheel 11, which may be connected to a crankshaft (not shown) of an engine of the vehicle or similar source of rotational energy. Rotational movement of the crankshaft by the vehicle engine, therefore, causes corresponding rotational movement of the flywheel 11. A cover 12 is connected to the flywheel 11 for rotation therewith. A pressure plate 13 is disposed between the flywheel 11 and the cover 12. Means (not shown) are provided for connecting the pressure plate 13 to the cover 12 for rotation therewith, while permitting the pressure plate 13 to move axially relative thereto.

A driven disc assembly, indicated generally at 15, is disposed between the flywheel 11 and the pressure plate 13. The driven disc assembly 15 includes a hub 16 which is splined onto an output shaft 17 of the clutch 10. The driven disc assembly 15 further includes a support plate 18 which is mounted on the hub 16 for limited rotational movement relative thereto. The support plate 18 is provided with a plurality of friction elements 19. These friction elements 19 are secured to the opposed faces of the support plate 18 near the outer periphery thereof. Thus, when the pressure plate 13 is moved toward the flywheel 11, the friction elements 19 are frictionally engaged by the flywheel 11 and the pressure plate 13. As a result, the driven disc assembly 15 and the output shaft 17 rotate with the flywheel 11, the cover 12, and the pressure plate 13. When the pressure plate 13 is moved away from the flywheel 11, the driven disc assembly 15 and the output shaft 17 are free to rotate relative to the clutch 10.

The output shaft 17 extends outwardly from the clutch cover 11 into a housing 20 for a transmission. A conventional clutch brake 21 may be splined onto the output shaft adjacent the transmission housing 20. The purpose for the clutch brake 21 will be explained below.

An axially movable retainer assembly, indicated generally at 30, is provided for selectively moving the pressure plate 13 toward and away from the flywheel 11. The retainer assembly 30 is disposed concentrically about the output shaft 17 and includes a bearing housing 31, an actuating collar 32, and a sleeve 33. The bearing housing 31 is connected to and encloses an outer race of a conventional release bearing (not shown). The inner race of the bearing is connected to the sleeve 33, as is the actuating collar 32, for axial and rotational movement therewith. Thus, axial movement of the bearing housing 31 causes corresponding axial movement of the sleeve 33 and the actuating collar 32. The actuating collar 32 operates through conventional levers 35 (only two of which are illustrated) so as to cause axial movement of the pressure plate 13 toward and away from the flywheel 11 when the retainer assembly 30 is moved axially.

A plurality of springs 36 (only one is illustrated) react between the cover 11 and the actuating collar 32. The springs 36 are provided to generate a force against the actuating collar 32 so as to urge it (and the rest of the retainer assembly 30) toward the engaged position (toward the left in FIG. 1). As a result, the pressure plate 13 is also urged toward the engaged position.

A shift assembly, indicated generally at 40, is provided for moving the retainer assembly 30 out of the engaged position (toward the right in FIG. 1) against the urging of the springs 36. The shift assembly 40 includes a shift arm 41 which is connected to a rotatable pin 42. The shift arm 41 and the portion of the pin 42 connected thereto are typically located outside of a housing (not shown) for the clutch 10. The remainder of the pin 42 extends within such clutch housing, and a pair of fingers 43 (only one is illustrated) are connected thereto.

Pivoting movement of the shift arm 41 as shown by the curved arrow 45 causes corresponding rotational movement of the pin 42 and the fingers 43. This pivoting movement of the shift arm 41 may be effected by any known means, such as through a conventional linkage to a manually operable clutch pedal (not shown). As evident from FIG. 1, rotation of the pin 42 in a first direction (counter-clockwise in FIG. 1) causes the fingers 43 to engage the bearing housing 31 and move the bearing housing 31 axially toward the right. Therefore, the clutch 10 becomes disengaged. Rotation of the pin 42 in a second direction (clockwise in FIG. 1) moves the fingers 43 toward the left, permitting the springs 36 to move the retainer assembly 30 to the engaged position.

Figure 4:
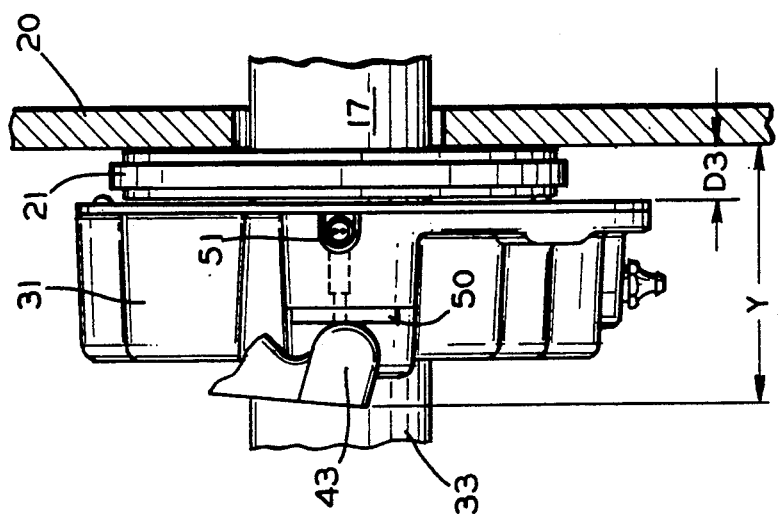
FIG. 4 is a view similar to FIG. 2 showing the components of the clutch in the disengaged position.
Figure 3:
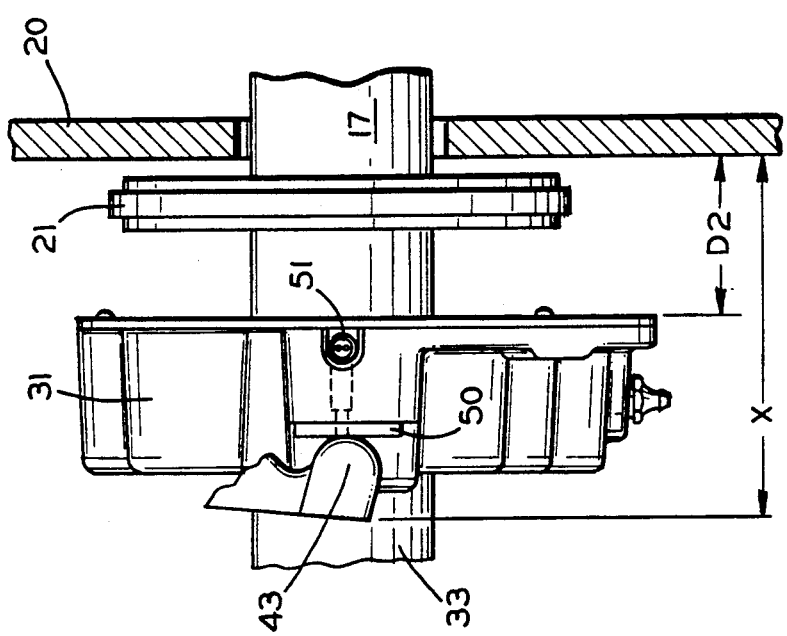
FIG. 3 is a view similar to FIG. 2 showing the components of the clutch in the engaged position when the friction elements are excessively worn.
Figure 2:
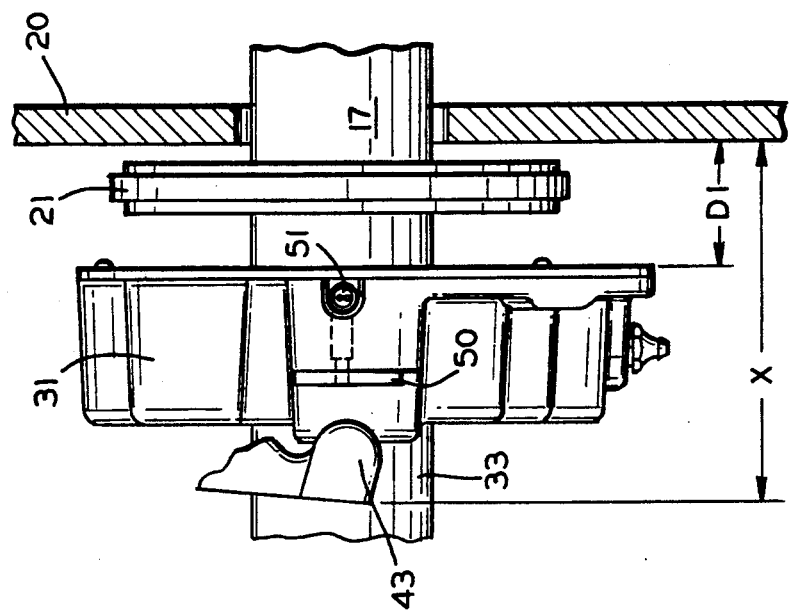
FIG. 2 is an enlarged sectional side elevational view of a portion of the clutch of FIG. 1 showing the components thereof in the engaged position when the friction elements are new.

Referring now to FIGS. 2, 3, and 4, it can be seen that two thrust plates 50 (only one is illustrated) are secured to the bearing housing 31. The thrust plates 50 are positioned such that the forward surfaces thereof are engaged by the fingers 43 of the shift assembly 40 when the clutch 10 is disengaged (see FIG. 4). The purpose of these thrust plates 50 will be further explained below.

FIG. 2 illustrates the components of the clutch 10 in the engaged position when the friction elements 19 have not become worn through use. In this situation, the bearing housing 31 is positioned a predetermined axial distance D1 from the transmission housing 20. FIG. 3 illustrates the same components of the clutch 10 in the engaged position when the friction elements 19 have become excessively worn through use. In this situation, the bearing housing 31 is positioned an axial distance D2 from the transmission housing 20 which is greater than the axial distance D1. The additional axial movement of the bearing housing 31 toward the engaged position when the clutch 10 is worn (D2 less D1) is required to cause frictional engagement of the thinner friction elements 19 of the driven disc assembly 15. Thus, it can be seen that the engaged position of the bearing housing 31 will move successively farther away from the transmission housing 20 as the friction elements 19 become worn during use.

However, the engaged position of the fingers 43 of the shift assembly 40 remains constant relative to the transmission housing 20, regardless of the amount of wear of the friction elements 19. This is because the movement of the fingers 43 is related only to the clutch pedal and linkage connected thereto, not to the thickness of the friction elements 19. Thus, as shown in FIGS. 2 and 3, the engaged position of the fingers 43 is always located an axial distance X from the transmission housing 20 when the clutch 10 is engaged.

As a result, it can be seen in FIG. 2 that the fingers 43 are spaced apart from the thrust plate 50 when the clutch 10 is engaged and the friction elements 19 are not worn. As such wear occurs through use of the clutch 10, the engaged position of the bearing housing 31 will move closer toward the engaged position of the fingers 43. When an excessive amount of wear has occurred, the thrust plates 50 of the bearing housing 31 will contact the fingers 43 even when the clutch 10 is engaged, as shown in FIG. 3.

FIG. 4 illustrates the components of the clutch 10 in the disengaged position, as opposed to the engaged positions illustrated in FIGS. 2 and 3. In this position, the fingers 43 have been moved into contact with the thrust plates 50 to move the bearing housing 31 toward the transmission housing 20. Thus, the bearing housing 31 is positioned an axial distance D3 from the transmission housing 20 which is much smaller than the axial distances D1 and D2. Similarly, the fingers 43 are located an axial distance Y from the transmission housing 20 which is much smaller than the axial distance X. By moving the bearing housing 31 a sufficient distance in this direction, the clutch brake 21 will be frictionally engaged between the bearing housing 31 and the transmission housing 20, thus slowing the rotation of the output shaft 17 to facilitate a gear changing operation in the transmission.

A sensor 51 is supported within the bearing housing 31. The end of the sensor 51 extends through an aperture formed through the thrust plate 50 so as to be located adjacent to the forward surface thereof. The sensor 51 is conventional in the art and is adapted to generate a signal, typically an electrical signal, when the finger 43 engages the forward surface of the thrust plate 50. Alternatively, the sensor 51 may generate an electrical signal when the finger 43 is located a predetermined distance therefrom. In any event, the electrical signal generated by the sensor 51 is fed to a control circuit 60 (see FIG. 5), which will be explained in detail below.

When the components of the clutch 10 are positioned as shown in FIG. 2 (engaged and not worn), the fingers 43 are spaced apart from the thrust plates 50 and the sensor 51. Consequently, the sensor 51 does not generate any electric signal in this situation. When the components of the clutch 10 are positioned as shown in FIG. 3 (engaged and worn), the fingers 43 are in contact with the thrust plates 50 and the sensor 51. Consequently, the sensor 51 does generate an electric signal in this situation. Lastly, when the components of the clutch 10 are positioned as shown in FIG. 4 (disengaged), the fingers 43 are in contact with the thrust plates 50 and the sensor 51. Consequently, the sensor 51 also generates an electric signal in this situation.

Figure 5:
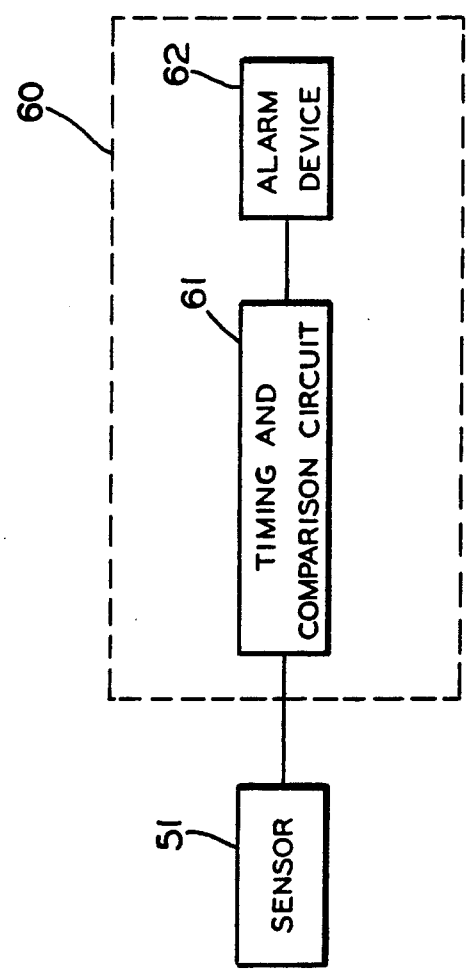
FIG. 5 is a block diagram of an electronic control circuit in accordance with this invention.

Referring now to FIG. 5, there is illustrated a block diagram of the control circuit 60 mentioned above. The control circuit 60 includes a timing and comparison circuit 61 which receives the electrical signal from the sensor 51. The timing and comparison circuit 61 is responsive to the signal from the sensor 51 for activating an alarm device 62 only when the signal from the sensor 51 has been continuously generated for longer than a predetermined period of time. For example, the timing and comparison circuit 61 may be set to activate the alarm device 62 only when the signal from the sensor 51 has been continuously generated for five minutes or longer. The structure of the timing and comparison circuit 61 may be of any conventional design which is easily within the realm of any person having ordinary skill in the art.

The operation of the control circuit 60 will now be described in conjunction with the operation of the clutch 10. As mentioned above, FIG. 2 illustrates the components of the clutch 10 in the engaged position when the friction elements 19 have not become worn through use. Thus, the fingers 43 are spaced apart from the thrust plates 50 and the sensor 51, and no electrical signal is generated to the control circuit 60.

When it is desired to disengage the clutch 10 to effect a gear changing operation in the transmission, the shift arm 41 is moved such that fingers 43 engage the thrust plates 50 and move the bearing housing 31 toward the transmission housing 20, as shown in FIG. 4. However, when the gear changing operation is completed, the clutch 10 is returned to the engaged position illustrated in FIG. 2. During the period of time that the clutch 10 is disengaged (FIG. 4), the sensor 51 generates the electrical signal to the timing and comparison circuit 61 of the control circuit 60. As mentioned above, the timing and comparison circuit 61 may be set to activate the alarm device 62 only when the signal from the sensor 51 has been continuously generated for five minutes or longer. Because a normal gear changing operation requires far less time than this predetermined five minute period, the alarm device 62 will not be activated.

However, when the friction elements 19 of the clutch 10 have become excessively worn through use, the fingers 43 engage the thrust plates 50 even when the clutch 10 is engaged, as shown in FIG. 3. Thus, the sensor 51 continuously generates an electrical signal to the timing and comparison circuit 61 of the control circuit 60. When the time duration of this electrical signal exceeds the predetermined five minute limit, the alarm device 62 will be activated. The alarm device 62 may be any conventional audible or visual indicator designed to alert the driver of the vehicle that the friction elements 19 of the clutch 10 are excessively worn and, therefore, require service.

The clutch adjustment indicator of this invention is also effective to alert a driver of the vehicle when he is improperly operating the clutch 10. On occasion, a driver may continuously rest his foot on the clutch pedal, even though the clutch 10 is engaged. "Riding" the clutch pedal in this manner is undesirable because it causes undue wear on the components of the clutch 10. When this occurs, the fingers 43 of the shift assembly 40 are moved into engagement with the bearing housing 31, even though the bearing housing 31 is not moved axially. As a result, the sensor 51 generates the electrical signal to the control circuit 60 as described above. If this condition continues for longer than the predetermined period of time, the alarm device 62 will be activated. Therefore, the driver of the vehicle will be alerted to remove his foot from the clutch pedal. If he does so, the alarm device 62 will be deactivated (assuming that the friction elements 19 are not worn).

Figure 6:
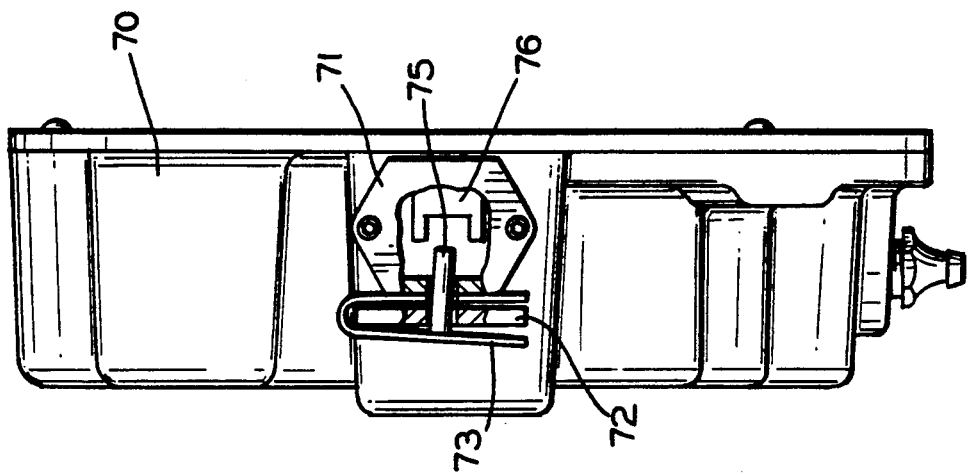
FIG. 6 is an enlarged side elevational view, partially broken away, of an alternate embodiment of a bearing housing for a clutch adjustment indicator apparatus in accordance with this invention.

FIG. 6 is an enlarged side elevational view of an alternate embodiment of a bearing housing 70 for a clutch adjustment indicator apparatus in accordance with this invention. In this embodiment, a sensor housing 71 is mounted on the bearing housing 70 adjacent a thrust plate 72. A generally U-shaped spring 73 has a first leg which extends between and is secured to the sensor housing 71 and the thrust plate 72. The second leg of the spring 73 is disposed adjacent the forward surface of the thrust plate 72. A pin 75 is secured to the inner surface of the second leg of the spring 73. The pin 75 extends within the sensor housing 71. A conventional sensor 76 is disposed within the sensor housing 71. As with the sensor 51, the sensor 76 is conventional in the art and is adapted to generate a signal, typically an electrical signal, when the pin 75 is moved in or near it.

The second leg of the spring 73 is positioned so as to be engaged by the fingers 43 in the manner described above with respect to the forward surface of the thrust plate 50. Thus, when the clutch 10 is disengaged, or when the friction elements 19 of the clutch 10 become excessively worn, the fingers 43 bend the second leg of the spring 73 such that the pin 75 is moved toward the sensor 76 contained within the sensor housing 71. As a result, the sensor generates an electrical signal to the control circuit 60, as described above.

In accordance with the provisions of the patent statutes, the principle and mode of operation of this invention have been described and illustrated in its preferred embodiment. However, it must be understood that the invention may be practiced otherwise than as specifically explained and illustrated without departing from its spirit or scope.

What is claimed is:

1. A clutch comprising:
a flywheel;

a cover connected to said flywheel for rotation therewith;

a pressure plate disposed between said flywheel and said cover for rotation therewith and for axial movement relative thereto between engaged and disengaged positions;

an output shaft;

a driven disc assembly mounted on said output shaft for rotation therewith and disposed between said flywheel and said pressure plate, said driven disc assembly including friction elements which are engaged by said flywheel and said pressure plate when said pressure plate is moved to said engaged position;

a retainer assembly disposed about said output shaft and movable between engaged and disengaged positions for moving said pressure plate between said engaged and disengaged positions;

a shift assembly selectively engageable with said retainer assembly for effecting movement of said retainer assembly and said pressure plate between said engaged and disengaged positions; and means mounted on said retainer assembly and responsive to the relative positions of said retainer assembly and said shift assembly for generating a signal when said friction elements have become excessively worn.

2. The invention defined in claim 1 wherein said retainer assembly includes a housing disposed about said output shaft and means for connecting said housing to said pressure plate for movement therewith between said engaged and disengaged positions.

3. The invention defined in claim 2 wherein said means responsive to the relative positions of said retainer assembly and said shift assembly is mounted on said housing of said retainer assembly.

4. The invention defined in claim 1 wherein said means responsive to the relative positions of said retainer assembly and said shift assembly includes a sensor for generating said signal.

5. The invention defined in claim 4 wherein said sensor generates said signal when said shift assembly engages said retainer assembly.

6. The invention defined in claim 4 wherein said sensor generates said signal when said shift assembly is a predetermined distance from said retainer assembly.

7. The invention defined in claim 1 further including means responsive to the generation of said signal for longer than a predetermined period of time for generating an alarm signal.

8. A clutch comprising:

a flywheel;

a cover connected to said flywheel for rotation therewith;

a pressure plate disposed between said flywheel and said cover for rotation therewith and for axial movement relative thereto between engaged and disengaged positions;

an output shaft;

a driven disc assembly mounted on said output shaft for rotation therewith and disposed between said flywheel and said pressure plate, said driven disc assembly including friction elements which are engaged by said flywheel and said pressure plate when said pressure plate is moved to said engaged position, said friction elements defining a thickness which is decreased as wear occurs resulting from engagement by said flywheel and said pressure plate;

a retainer assembly disposed about said output shaft and movable between engaged and disengaged positions for moving said pressure plate between said engaged and disengaged positions;

a shift assembly including a member which is selectively engageable with said retainer assembly for effecting movement of said retainer assembly and said pressure plate between said engaged and disengaged positions, said retainer assembly and said member being spaced apart by a distance which is related to said thickness of sad friction elements when said retainer assembly is in said engaged position; and means mounted on said retainer assembly and responsive to the relative positions of said retainer assembly and said member of said shift assembly for generating a signal when said thickness of said friction elements has decreased by a predetermined amount.

9. The invention defined in claim 8 wherein said retainer assembly includes a housing disposed about said output shaft and means for connecting said housing to said pressure plate for movement therewith between said engaged and disengaged positions.

10. The invention defined in claim 9 wherein said means responsive to the relative positions of said retainer assembly and said member of said shift assembly is mounted on said housing of said retainer assembly.

11. The invention defined in claim 8 wherein said means responsive to the relative positions of said retainer assembly and said member of said shift assembly includes a sensor for generating said signal.

12. The invention defined in claim 11 wherein said sensor generates said signal when said member of said shift assembly engages said retainer assembly.

13. The invention defined in claim 11 wherein said sensor generates said signal when said member of said shift assembly is a predetermined distance from said retainer assembly.

14. The invention defined in claim 11 wherein said sensor is disposed within a sensor housing which is secured to said housing of said retainer assembly.

15. The invention defined in claim 14 further including a thrust plate secured to said housing of said retainer assembly adjacent to said sensor housing.

16. The invention defined in claim 15 further including a generally U-shaped flexible member having a first leg and a second leg, said first leg extending between said thrust plate and said sensor housing and secured thereto, said second leg extending between said thrust plate and said member of said shift assembly and engageable by said member of said shift assembly.

17. The invention defined in claim 16 wherein said thrust plate and said first leg of said flexible member have aligned apertures formed therethrough.

18. The invention defined in claim 17 further including a pin secured to said second leg of said flexible member and extending through said aligned apertures, said sensor being responsive to the relative positions of said retainer assembly and said pin for generating said signal.

19. The invention defined in claim 8 further including means responsive to the generation of said signal for longer than a predetermined period of time for generating an alarm signal.

* * * * *